United States Patent [19]

Hützen

[11] Patent Number: 5,182,309
[45] Date of Patent: Jan. 26, 1993

[54] POLYURETHANE FOAM MATERIAL FREE OF HALOGENATED HYDROCARBONS AND PROCESS FOR PRODUCING THE SAME

[76] Inventor: Hans W. Hützen, Greefsallee 51, D-4060 Viersen 1, Fed. Rep. of Germany

[21] Appl. No.: 635,152

[22] PCT Filed: Apr. 12, 1990

[86] PCT No.: PCT/EP90/00581
§ 371 Date: Dec. 21, 1990
§ 102(e) Date: Dec. 21, 1990

[87] PCT Pub. No.: WO90/12841
PCT Pub. Date: Nov. 1, 1990

[30] Foreign Application Priority Data

Apr. 24, 1989 [DE] Fed. Rep. of Germany ....... 3913473
Oct. 9, 1989 [DE] Fed. Rep. of Germany ....... 3933705
Oct. 31, 1989 [DE] Fed. Rep. of Germany ....... 3936227
Feb. 8, 1990 [DE] Fed. Rep. of Germany ....... 4003718

[51] Int. Cl.$^5$ .............................................. C08G 18/14
[52] U.S. Cl. ..................................... 521/99; 521/107; 521/108; 521/131
[58] Field of Search .................. 521/99, 131, 107, 108

[56] References Cited

U.S. PATENT DOCUMENTS 3,189,565 6/1965 Woods et al. ................. 260/2.5
3,509,076 4/1970 Anderson ..................... 260/2.5

FOREIGN PATENT DOCUMENTS 0078478 11/1983 European Pat. Off. .
0125582 11/1984 European Pat. Off. .
0334059 9/1989 European Pat. Off. .
3835193 4/1990 Fed. Rep. of Germany .
2111694 9/1972 France .

*Primary Examiner*—Maurice J. Welsh
*Attorney, Agent, or Firm*—Pearne, Gordon, McCoy & Granger

[57] ABSTRACT

The present invention is related to polyurethane foam materials, pores thereof being free of halogenated hydrocarbon compounds, in particular free of CFCs, and a process for producing the same wherein no halogenated hydrocarbon, in particular no CFC is used as foaming agent. The pores of the polyurethane foam material contain minor amounts of the vaporized foaming agent used in the process of the invention, i.e. of the organic liquid product selected from the group consisting of a lower alkane having 3 to 6 carbon atoms or a mixture of such lower alkanes, said liquid foaming agent having a boiling point between $-10°$ and $=70°$ C. at normal pressure. In the process of the present invention said foaming agent is either finely dispersed in the mixture of the alcoholic starting component and the isocyanate starting component or said foaming agent is first emulsified in the alcoholic starting component, if necessary with the aid of an emulsifying agent, and the isocyanate component thereafter is added to this emulsion, and then the exothermic polymerization reation of the starting components is effected. Possibly, the so produced polyurethane foam material is stored for several hours or days.

28 Claims, No Drawings

POLYURETHANE FOAM MATERIAL FREE OF HALOGENATED HYDROCARBONS AND PROCESS FOR PRODUCING THE SAME

The present invention is related to a polyurethane foam material (hereinafter referred to as PUR foam material) having a particularly uniform cellular foam structure, the pores whereof being free of halogenated hydrocarbon compounds. Such halogenated hydrocarbon compounds, in particular the fully halogenated chlorofluorocarbons or CFC have been used in the prior art processes as foaming agents. The present invention is further related to processes for producing such PUR foam materials where no halogenated hydrocarbons are used as foaming agent.

PUR foam materials are used in large amounts for the most varying purposes, for instance for cushions, as intermediary layers to be placed under carpets, in upholstered furniture, for packaging purposes, as isolating material in houses or in freezing furniture. There are produced soft foams, medium rigid foams and rigid foams from PUR. In general, soft foams are produced using carbon dioxide as foaming agent. Carbon dioxide is produced in the reaction between the diisocyanates started from and water added to the reaction mix. Some of the soft foams however are also produced by means of CFCs as foaming agent. Solid foams are mostly produced with CFCs as foaming agent. CFCs as foaming agent are used in large amounts. Substantial amounts of the foaming agent escape during production or is liberated when foam pore walls are broken during the use of the PUR foam material. The CFCs as foaming agent produce desirable results in many respects. They provide in the produced PUR foam material desirable non-inflammability properties. Furthermore, the PUR foam materials produced with these foaming agents have further desirable physical properties such as in particular a low heat conductivity, expressed in low lambda values, as they are most desired in the production of furnitures for living homes, in cushions and in the construction of living homes and of other houses. Thus, the PUR foam materials produced with these foaming agents may be classified into very desired heat conductivity groups which are most desirable for various fields of use of the foam materials. By the addition of further flame retardants to the mixture of the starting components the flame retardant properties of the resulting PUR foam materials may be further increased until the fire retardant reaches classes B2 and B1. Since PUR foam materials are produced by foaming liquid starting components, the use of CFCs or water results in a very uniform cell structure with a low volume weight of the resulting material. This allows a simple foaming of the material in molds or on a continuous conveyer belt. This latter procedure is particularly applied for producing isolating sheets from PUR solid foams as they are used in buildings and the like constructions. This procedure further allows the production of the PUR foam material with a solid sheet material on both sides of the foam sheet from a flexible or rigid material, thus producing a foam sandwich structure.

However, under enviromental aspects it is most disadvantageous in this desirable material and its production that for the foaming of such materials, in particular of PUR rigid foam materials, there are used almost solely chlorofluorocarbons (CFCs) as foaming agent and that theses CFCs show a highly negative effect to the ozone layer in the atmosphere of the globe as ozone-depleting material. Therefore, the use of such foaming agents is not at all desirable and is even forbidden in many countries. For several years substantial research has been done to partly or even completely substitute the CFCs as foaming agent in view of their undesirable ozone-depleting properties.

For instance tests have been made in the production of PUR soft foam materials to combine the known addition of water to the used starting material containing isocyanate together with other features such that carbon dioxide is used as additional or main foaming agent, thus lowering or even avoiding the undesired release of the hazardous CFCs. However, such procedures have deleterious effects to the physical properties of the resulting PUR foam material. The early formation of carbon dioxide as foaming agent results in PUR foam materials having opened pores to a great extent. Furthermore, the material is quite soft when not fully polymerized and the thin pore walls in such material easily are broken. This pore wall breaking may be tolerated or is even desirable in PUR soft foam materials, but is most undesirable in PUR solid foams where a high mechanical stability is requested. Furthermore, water to produce carbon dioxide as foaming agent has a deleterious effect to the isolating properties of the resulting PUR foam material, whether produced as soft foam or as rigid foam. Finally, the use of water renders more expensive the resulting PUR foam material because 1 part of water consumes 16 parts of diisocyanate in the carbon dioxide producing reaction and this amount of diisocyanate has to be added to the starting mix. When using CFCs as foaming agents, a substantially lower amount of diisocyanate is requested.

Other organic materials which are volatile during the reaction of the PUR foam starting materials may not be used or showed to be not useful because organic products free of halogen very often are easily flammable or even produce highly explosive mixtures with the oxygen of the air. Therefore, such foaming agents harzardous to the human security were to be avoided even if the producer of such materials provides a secure removal of the vapor of such organic liquids liberated during the foaming procedure. However, in many of the above mentioned fields of use, the closed pores of the PUR foam material may break open during the use and the organic liquids and vapor thereof within the pores may be liberated later on and even then may cause danger. On the other side, the use of foaming agents free of halogen has been described in the production of UV radiation resistant colored PUR foam materials (see JP 57 126 815). However, such materials do not have the requested low volume weights.

Further tests to substitute the CFCs or to reduce the amount of CFCs have been made by beating air into the starting mix for the polymerization by mechanical means. Thus, it is known to mix separately air mechanically into the alcohol containing component or into the diisocyanate component or into both of them by means of whisks or beaters. However, in this embodiment dosing of the components is difficult because of differing density of the air-alcoholic and/or air-isocyanate starting mix. Furthermore, the pore structure of the resulting foam materials is not at all uniform as desired. However, a uniform and fine pore structure in the resulting foam material with low volume weight is a prerequisite for good insulating properties in the resulting foam material. With such a procedure the desired low volume weight of 30 g/cm³ and lower cannot be achieved with air as foaming agent alone.

Finally, it has been discussed to substitute the CFCs by not fully halogenated hydrocarbons such as fluorinated hydrocarbons (HFCs or HCFCs). However, such CFC alternatives are very expensive and their ozone-depleting effects over long periods of times has not yet been fully studied.

Object of the present invention therefore is to provide PUR foam materials the pores whereof are free of halogenated hydrocarbons, in particular those having a low volume weight, low lambda values (i.e. a low heat conductivity, high heat isolating properties) and high fire guard values (i.e. a low flammability class) as well as processes for producing such PUR foam materials wherein no foaming agent is used which is classified as halogenated hydrocarbon.

The PUR foam materials according to the present invention, in particular the PUR rigid foams are materials wherein the partly closed and preferably substantially closed pores are void of halogenated hydrocarbons, whether CFCs or HCFCs or HFCs and contain minor amounts of the foaming agents used in the process for producing such PUR foam materials, said foaming agent representing an organic liquid product selected from the group consisting of a lower alkane having 3 to 6 carbon atoms and a mixture of several such lower alkanes having 3 to 6 carbon atoms, said organic liquid product having a boiling point at normal pressure between −10° and +70° C., which foam material has a uniform pore structure and a volume weight of 30 g/cm³ or a lower volume weight. The PUR material of said foam further contains usual additives, such as catalysts, pore stabilizing agents, cross-linking agents, flame retardants and/or emulsifying agents. The pores of the final PUR foam material may contain the volatilized foaming agent in minor amounts up to about 30% of the pore volume. In general, such amounts are lower, depending upon the PUR starting materials, the duration of the final storage of the PUR foam material, the temperature and the pressure applied during storage, i.e. conditions influencing the exchange of outer air with the volatilized foaming agent by diffusion thereof through the pore walls.

In a preferred embodiment of the PUR foam material of the present invention, the pores of the foam beside the remainders of the foaming agent of the invention and air which during the production of the foam material and the storage of the PUR foam material diffused into the pores in exchange with the vaporized foaming agent, contain an additional gas selected from the group consisting of nitrogen in addition to and in larger amounts than the usual content in air, a noble gas, a mixture of nitrogen and a noble gas or a mixture of several noble gases. Particularly preferred in this embodiment as additional gas is the noble gas argon.

Preferably, the PUR foam material of the present invention comprises one or several usual liquid or solid flame retardants, preferably a phosphorous containing compound or a boron containing compound known as flame retardant. This flame retardant is preferably present in amounts of 5 to 35% by weight, most preferably 10 to 20% by weight, based upon the total weight of the PUR foam material according to the present invention. In a most preferred embodiment, the PUR foam material of the present invention comprises as solid flame retardant an ammonium salt such as the ammonium salt of phosphoric acid, of metaphosphoric acid, of a polyphosphoric acid or of boric acid.

In another preferred embodiment, the PUR material of the foam solely or together with a solid flame retardant, comprises, as liquid phosphorous containing flame retardant, a lower alkyl ester of a lower alkane phosphonate of formula

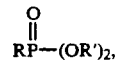

R und R' being lower alkyl groups with 1 to 4 carbon atoms, preferably methyl groups. Most preferred, this particular liquid flame retardant is used in combination with urea, in partuclar in amounts of 10 to 20% by weight, based upon the weight of the liquid phosphorous containing flame retardant. Further most preferred, this liquid phosphorous containing flame retardant contains urea dissolved up to saturation of the liquid flame retardant in urea.

As catalyst, preferably a basic or highly basic catalyst is used in usual amounts, such as an alkali metal salt of a weak acid, preferably of an alkane carbonic acid such as acetic acid or octanoic acid. This catalyst or remainders of this catalyst may be found in this preferred embodiment of the final PUR material of the foam according to the present invention.

According to another most preferred embodiment of the present invention, the PUR foam material contains minor amounts of the particular foaming agent of the present invention as well as the solid flame retardant in the form of an ammonium salt of the above given acid as well as the preferred liquid flame retardant and urea in the above given amounts as well as the basic up to strong basic catalyst compound. Depending upon the particular starting mix, the PUR foam material of the present invention may contain up to 10% by weight of an emulsifying agent. Most preferred the PUR foam material of the invention contains as emulgating agent a saturated or unsaturated fatty acid or ester thereof or a derivative thereof.

The process of the present invention for producing the PUR foam material of the present invention is characterized in that as foaming agent there is used an organic liquid agent unsubstituted by a halogen and selected from the group consisting of a lower alkane having 3 to 6 carbon atoms and a mixture of several such lower alkanes having 3 to 6 carbon atoms, said liquid foaming agent having a boiling point between −10° and +70° C. at normal pressure, and said foaming agent being either admixed to the mixture of the alcoholic starting component and the isocyanate starting component for the PUR foam material in usual proportions between said alcohol starting component and said isocyanate starting component, said mixture comprising the other additives such as catalysts, porestabilizing agents and flame retardants in usual amounts or, preferably, said foaming agent being finely dispersed in the alcoholic starting component for the PUR foam material with addition of the above given further additives and, thereafter, the isocyanate starting component for the PUR foam material of the invention is admixed to this finely divided product in usual manners and with usual proportions between said alcohol starting component and said isocyanate starting component, and the polymerization of said mix of the starting materials for the PUR foam material to be produced is effected under usual conditions, in particular usual temperature conditions. In both embodiments of the above procedure, the foaming agent is added in such amounts to the starting materials as necessary to produce the desired PUR foam density, i.e. the desired degree of foaming of the resulting foam material. If more foaming is desired, i.e. if less dense foam materials are desired, larger amounts of the liquid foaming agent have to be admixed to the respective starting materials. The expert in the art may calculate the exact amount to be added to the starting mix from the known volume of the vaporized liquid foaming agent and the desired density of the final PUR foam material. Such calculations are known to the expert in relation to other known foaming agents such as the CFCs. If necessary in view of the boiling point of the applied organic liquid foaming agent, the polymerization may be effected with the application of a pressure somewhat decreased or increased over normal pressures during the foaming step of the process of the invention. The resulting PUR foam material preferably is stored for a period of 2 days up to several months, preferably 2 to 7 days, at room temperature or weakly increased temperature (about 45° C.) at atmospheric pressure or at a somewhat lowered pressure.

In a preferred embodiment, there is added to the starting emulsion as flame retardant a liquid and/or solid flame retardant containing a phosphorus or boron derivative, preferably in an amount of 5 to 35% by weight, preferably 10 to 20% by weight, based upon the total weight of the final foam material. Most preferred, the used flame retardant is an ammonium salt of a phosphorus compound and/or boron compound, most preferably one in solid and crystalline form.

According to another preferred embodiment of the process of the present invention, a liquid flame retardant is used, said liquid flame retardant being preferably an ester of a lower alkane phosphonic acid of the following formula $RP(=O)(-OR')_2$ with 1 to 4 carbon atoms in the lower alkane group R, in particular of an ester of a lower alkanol with 1 to 4 carbon atoms in the ester group —OR'. A most preferred member of this group is methyl phosphonic acid dimethyl ester wherein both R and R' are methyl. In another preferred embodiment of the process of the present invention, this liquid phosphorous containing flame retardant of the above formula is used in admixture with urea, preferably in an amount of 10 to 20% by weight, based upon the weight of the liquid phosphorous containing flame retardant. According to a most preferred embodiment of the invention, urea is used in admixture with the liquid flame retardent in such an amount that urea is present in the liquid phosphorous containing flame retardant as saturated solution of urea in said liquid flame retardant. With this last mentioned embodiment, the resulting good flame retardant values are obtained over prolonged periods of time as is most desired for the use of the final PUR foam materials.

Useful diisocyanates or PUR-prepolymers with at least two free isocyanate groups in the molecule are known to the expert in the art. Furthermore, suitable dialcohols or other compounds having at least two free hydroxy groups in the molecule such as polyether polyols and/or polyester polyols are known to the expert. Still known to the expert is how these two groups of starting components and in which weight proportions to each other the dialcohol and diisocyanate compounds are reacted with each other to produce PUR soft foam materials, PUR semirigid foam materials or PUR rigid foam materials.

In this respect reference is made to the many German and foreign patents and patent applications of most various patent owners and applicants and the many general publications, said patents and patent applications being classified in the international patent class C 08 G subclass 18. Example of general literature is Römpp-Chemielexikon, 7th ed. (1975), pgs. 2774 to 2775 and the further references there given. All these references and the information contained therein is incorporated into the present application by reference.

Suitable organic liquid compounds to be used in the process of the present invention as foaming agent are such compounds which do not dissolve in the alcohol starting component for the PUR foam materials to be produced or such compounds which substantially do not dissolve in said alcohol starting component and which produce emulsions with said alcohol starting component, if necessary with the addition of an emulsifying agent, preferably in the amount of up to 10% by weight of the amount of PUR alcohol starting component. Examples for such suitable foaming agents are the lower alkanes with 3 to 6 carbon atoms such as n-butane, n-pentane, isopentane, n-hexane, dimethylbutane or mixtures of several such compounds as they are by-products in the distillation of mineral oil and as they often are removed by flaring. The best results and therefore the most preferred such foaming agents are selected from the group consisting of n-pentane and isopentane. These foaming agents produce a PUR foam material having a very uniform cell structure with a small pore size which structure is maintained even after storage of the produced foam material.

The liquid and solid flame retardents used in the process of the present invention, in particular such phosporous or boron containing flame retardants as well as the preferred ammonium salts thereof are known to the expert of the PUR foam field. Examples for such useful compounds are borates, phosphates, metaphosphates, polyphosphates and the above mentioned lower alkanol esters of lower alkane phosphonic acids. In order to obtain products having the flame class B2, the flame retardants are used in amounts of for instance about 6000 $g/m^3$ or more. Particularly useful and therefore preferred among the solid flame retardants are ammonium salts of this group. Other suitable flame retardants of the preferred group of solid flame retardants are barium metaborate or zinc borate. The solid flame retardants are not added to the starting mix by means of the high pressure dosing pump because such products represent abrasive powders. Therefore such solid flame retardants are added to the starting mixture by means of a mixing snail arranged immediately after the mixing head for mixing liquid starting materials (PUR starting components plus foaming agent).

Suitable emulsifying agents are also known to the expert. Suitable products in particular, and therefore preferred, are products of saturated and unsaturated fatty acids such as fatty acid alkanolamide ethoxylates.

Suitable products for cross-linking of PUR foams are also known to the expert such as certain Mannich base materials. Even small amounts of water such as 0.5 to 2% by weight of the starting mixture may be used as cross-linking agent and, therefore, may be added to the starting mixture. The amount of diisocyanates started from has to be increased somewhat in order to obtain the correct proportion between the alcoholic starting component and the isocyanates starting component. Preferably both the above kinds of cross-linking agents are used.

It is preferred to use an emulsifying agent when emulsifying the liquid foaming agent in the alcoholic starting component for the PUR foam material of the invention. By this embodiment, the formation of an emulsion between the liquid foaming agent and the alcoholic starting component is highly improved. This formation of an emulsion of the liquid foaming agent and the alcoholic starting component is necessary in the process of the present invention. The addition of the emulsion agent however further promotes the exchange of the vaporized liquid foaming agent with air during the final storage period of the freshly foamed material.

The time period for the final storage and for the exchange of the used organic foaming agent against air is dependent upon the actually used starting components, the particular used foaming agent, the surrounding air temperature, the possibly applied lowered pressure and the kind and the amount of the preferably used solid flame retardants as well as the basic catalyst and/or the applied emulgating agent. In some instances, the resulting PUR foam materials are obtained already in the flame class B2 without storage, depending upon the selected starting mix and the used flame retardants and the used amount of flame retardants as well as the used catalysts. The time of storage in general is 2 to 7 days, sometimes more prolonged, for instance up to 6 weeks and in rare instances up to 4 to 6 months. In general, the final storage period is terminated after 3 to 4 days. The exchange of the used foaming agent against harmless gases as air may be controlled by the flammability of the resulting foam material. As stated, the flammability is improved by a certain final period of storage. A further control is a certain increase of the heat conductivity from 0.021 kcal m/h° C. immediately before the start of the storage up to 0.025 kcal m/h° C. This heat conductivity of 0.025 Kcal m/h° C. then remains almost unchanged over a certain period of time which allows the conclusion that the exchange of the used organic foaming agent against air to the desired degree has been effected and is substantially terminated. As above stated, depending upon the selection of the various components and/or the amount and kind of the used solid flame retardant there may be obtained PUR foam materials already having the flame class B2 without final storage. It may also be observed, that the heat conductivity of 0.025 Kcal m/h° C. may decrease to values of 0.0205 Kcal m/h° C., a heat conductivity which has never been obtained by prior art processes.

Completely contrary to the above described increase of the heat conductivity of the PUR foamed material of the present invention during storage is the flammability of the produced material. Immediately after the foaming step, the PUR foam material often is easily flammable. During the storage, the flammability of the PUR foamed material decreases and improves from day to day of storage. The PUR foam material after about 2 to 7, in particular after 4 days of storage reaches a flammability corresponding to flame class B2 or even B1 with polyisocyanurate foam materials and upon addition of larger amounts of flame retardants. As mentioned, the durability of the low flammability of the PUR foam material according to the invention is improved when using a combination of the liquid phosporous containing flame retardant with urea.

It is to be mentioned that compatible with the present invention, both as to the PUR foamed material and as to the process to produce the same, if small amounts of halogenated hydrocarbons and even CFCs are admixed to the foaming agent of the present invention and the combination of both is used in order to produce product as defined in DIN 18164. According to subtitle 3.4 of this DIN it embraces only such PUR foam materials which have been produced "with the use of halogenated hydrocarbons as foaming agents by chemical reaction with compounds containing an acidic hydrogen". The organic liquid foaming agents used according to the present invention may be readily mixed with small amounts of halogenated hydrocarbons such that the necessary hydrocarbons are substituted up to 95 or even 99% by the liquid foaming agents of the present invention. Furthermore, the use of emulsifying agents in the present process is not disturbed when using small amounts of CFCs or methylene chloride. The latter product has a boiling point within the range defined for the present invention (b.p. = 40° C.).

The following examples further illustrate the present invention.

EXAMPLE 1

A PUR rigid foam material is produced by emulsifying at 22° C. a mixture composed of 50 parts by weight of a polyetheralcohol having a hydroxy number of about 550 (viscosity about 8000 cp at 25° C.) of the group of CARADOL(®) products of Messrs. Shell Chemie, 30 parts by weight of a saturated polyester having a hydroxy number of about 500 (viscosity about 8000 to 10000 cp at 25° C.) containing a cross-linking agent, 20 parts by weight of an aromatic polyetheralcohol having a hydroxy number of about 500 (viscosity about 5000 cp at 25° C.), 7 parts by weight of the liquid flame retardant dimethyl methylphosphonate (DMMP) having a phosphorous content of 26%, 5 parts by weight of the emulsifying agent EMULGIN ® 550 of Messrs. Henkel AG, 2 parts by weight of a silicone as pore stabilizing agent, 28 parts by weight of the solid flame retardant ammonium polyphosphate, 3 parts by weight of an alkali metal acetate catalyst, 18 parts by weight of n-pentane.

To this emulsion there are admixed 172 parts by weight of the diisocyanate MDI (diphenylmethan-4.4'-diisocyanate) in a manner usual in the production of PUR foam materials. The resulting mixture is foamed in a usual foaming machine at normal pressure and at room temperature. The resulting PUR foam material is finally stored for 4 days at room temperature (20° C.) and normal pressure.

The resulting PUR foam material has the following properties:

Density immediately after the foaming step: 30–40 g/cm$^3$; pressure tension immediately after the foaming step: about 1.3 kp/cm$^2$;

pressure tension after storage for 4 to 6 weeks: 1.6–1.7 kp/cm$^2$;

flammability immediately after the foaming step: short flame up, but thereafter extinguishing by itself; flammability after 4 days storage: B2.

| Heat conductivity: | |
| --- | --- |
| immediately after foaming step | about 0.021 |
| 20 days after foaming step | 0.024 to 0.025 |
| after storage for 14 to 16 weeks | 0.022 |
| after storage for 4 to 6 months | 0.0205. |

EXAMPLE 2

A PUR rigid foam material is produced as follows: The following mixture is emulsifying at room temperature 50 parts by weight of a polyetheralcohol having a hydroxy number of about 550 (viscosity about 8000 cp at 25° C.),
30 parts by weight of a saturated polyester containing a Mannich base cross-linking agent and having a total hydroxy number of about 500 (viscosity about 8000 to 10000 cp at 25° C.)
20 parts by weight of an aromatic polyetheralcohol having an hydroxy number of about 500 (viscosity about 5000 cp at 25° C.),
7 parts by weight of the liquid flame retardant dimethyl methylphosphonate,
5 parts by weight of the emulsifying agent EMULGIN ®C4 of Messrs. Henkel AG,
2 parts by weight of a silicone as pore stabilizing agent,
48 parts by weight of the solid flame retardant monoammonium phosphate,
3 parts by weight of a potassium acetate catalyst,
26 parts by weight of n-pentane containing up to 5% p-propane and n-butane.

172 parts by weight of the diisocyanate MDI are admixed to the resulting emulsion in a manner usual in the production of PUR foam materials. The resulting mixture is subjected to foaming in a usual endless conveyor belt machine under normal pressure. The resulting PUR foam material is finally stored for 4 days at room temperature (20° C.) and normal pressure.

EXAMPLE 3

A PUR rigid foam material is produced as follows: A mixture consisting of 52 parts by weight of a polyether alcohol having a hydroxy number of about 550 (viscosity about 8000 cp at 25° C.),
31 parts by weight of a saturated polyester containing a cross-linking agent and having a hydroxy number of about 500 (viscosity about 8000 to 10000 cp at 25° C.),
20 parts by weight of an aromatic polyetheralcohol having a hydroxy number of about 500 (viscosity about 5000 cp at 25° C.),
7 parts by weight of the liquid flame retardant DMMP containing 26% of phosphorous,
1 part by weight of water,
5 parts by weight of the emulsifying agent EMULGIN ®C4,
2 parts by weight of a silicon as pore stabilizer,
50 parts by weight of the solid flame retardant diammonium phosphate,
2 parts by weight of a potassium octoate catalyst,
25 parts by weight of n-pentane
are emulsifying at 22° C.

172 parts by weight of the diisocyanate MDI are admixed to this emulsion and the resulting mixture is foamed at normal pressure in a usual endless conveyor belt machine. The resulting PUR foam material thereafter is stored for 4 days at room temperature (20° C.) and normal pressure.

EXAMPLE 4

A PUR rigid foam material is produced as follows: A mixture consisting of 50 parts by weight of a polyether alcohol having a hydroxy number of about 550 (viscosity about 8000 cp at 25° C.) from the product group SUCCR 05 ®,
32 parts by weight of a saturated polyester having a hydroxy number of about 500 (viscosity about 8000 to 10000 cp at 25° C.),
20 parts by weight of an aromatic polyetheralcohol having a hydroxy number of about 500 (viscosity about 5000 cp at 25° C.),
7 parts by weight of the liquid flame retardant DMMP containing 26% of phosphorous,
5 parts by weight of the emulsifying agent EMULGIN ®550 of Messrs. Henkel AG,
2 parts by weight of a silicon as pore stabilizer,
1 part by weight of water as cross-linking agent,
38 parts by weight of the solid flame retardant ammonium polyphosphate mixed with 5% zinc borate,
3 parts by weight of an alkali acetate catalyst,
27 parts by weight of n-pentane
is emulsifying at room temperature.

172 parts by weight of diisocyanate MDI are admixed to the above emulsion and the resulting mixture is subjected to foaming at normal pressure in a usual continuous foaming machine. The resulting PUR foam material finally is stored for 4 days at room temperature (20° C.) and normal pressure.

EXAMPLE 5

A PUR rigid foam material has been prepared as follows: A mixture consisting of 50 parts by weight of a polyether alcohol having a hydroxy number of about 550 (viscosity about 8000 cp at 25° C.) from the group of the CARADOL ® product of Messrs. Shell Chemie,
30 parts by weight of a saturated polyester containing a cross-linking agent, having a hydroxy number of about 500 (viscosity about 8000 to 10000 cp at 25° C.),
20 parts by weight of an aromatic polyetheralcohol having a hydroxy number of about 500 (viscosity about 5000 cp at 25° C.),
8 parts by weight of a saturated solution of urea in the liquid flame retardant dimethylmethylphosphonate (DMMP) containing 26% of phosphorous, said solution containing 1.05 parts by weight of urea in 7 parts by weight of DMMP,
5 parts by weight of the emulsifying agent EMULGIN ®550 of Messrs. Henkel AG,
2 parts by weight of a silicon as pore stabilizing agent,
28 parts by weight of the solid flame retardant ammonium polyphoshphate,
3 part by weight of an alkali metal acetate catalyst,
18 parts by weight of n-pentane
have been emulsifying at 22° C.

172 parts by weight of diphenylmethane-4.4'-diisocyanate are admixed to the above emulsion in a manner as usual in the production of PUR foam materials and the resulting mixture is subjected to polymerization with foaming at room temperature and at normal pressure in a usual continuous foaming machine. The resulting PUR foam material finally is stored for 4 days at room temperature (20° C.) and normal pressure.

The flamability value in class B2 after this storage period was maintained even after further storing for 6 weeks, even when heating at moderately elevated temperatures.

I claim:

1. Polyurethane insulating foam material comprising a catalyst, a pore stabilizing agent and/or a flame retardant, wherein the pores are free from halogenated hydrocarbons and contain minor amounts of a foaming agent used in the production of the foam material and selected from the group consisting of a lower alkane containing 3 to 6 carbon atoms and the mixtures of several of such lower alkanes, said foaming agent having a boiling point at normal pressure between $-10°$ and $+70°$ C., and wherein said flame retardant is selected from the group consisting of the liquid and the solid flame retardants, said flame retardant or flame retardants being present in the foam material in an amount of 5 to 35 percent by weight based upon the total weight of the final foam material.

2. The polyurethane insulating foam material according to claim 1, wherein the lower alkane is n-pentane.

3. The polyurethane insulating foam material according to claim 1, wherein the lower alkane is isopentane.

4. The polyurethane insulating foam material according to claim 1, wherein the pores additionally comprise a gas selected from the group consisting of nitrogen in an amount larger than the usual nitrogen content of air, a noble gas and the mixtures of several such gases.

5. The polyurethane insulating foam material according to claim 4, wherein the pores of the foam material comprise the noble gas argon.

6. The polyurethane insulating foam material according to claim 1, wherein the polyurethane material contains a flame retardant selected from the group of the phosphorous containing flame retardants, the boron containing flame retardants and the mixtures of several such flame retardants.

7. The polyurethane insulating foam material according to claim 1, wherein the polyurethane material contains the flame retardant or flame retardants in an amount of from 10 to 20 parts by weight based upon the total weight of the final foam material.

8. The polyurethane insulating foam material according to claim 1, wherein the polyurethane material contains an ammonium salt as solid flame retardant.

9. The polyurethane insulating foam material according to claim 1, wherein the polyurethane material contains a liquid flame retardant which is selected from the group consisting of the lower alkanol esters of lower alkane phosphonates, wherein the lower alkanol and the lower alkane group each contain 1 to 4 carbon atoms, and the mixtures of several such liquid flame retardants.

10. The polyurethane insulating foam material according to claim 9, wherein the lower alkane phosphonate contains 10 to 20 parts by weight of urea based upon the weight of the lower alkane phosponate.

11. The polyurethane insulating foam material according to claim 10, wherein the lower alkane phosphonate contains urea up to saturation.

12. Process for producing the polyurethane insulating foam material, comprising the steps of adding to an alcoholic starting component for PUR foam material other additives selected from the group consisting of flame retardants, catalysts and pore stabilizers, admixing and emulsifying in the alcoholic starting component a non-halogenated organic liquid product selected from the group consisting of the lower alkanes having 3 to 6 carbon atoms and the mixture of several such lower alkanes, said lower alkane or mixture of several lower alkanes having a boiling point between $-10°$ and $+70°$ C. at normal pressure, adding to said emulsified mixture the isocyanate starting component in proportions as usual for the alcoholic starting component and the isocyanate starting component in PUR foaming materials, and thereafter effecting the polymerization of the starting components for the PUR foam material to be produced under usual conditions.

13. Process according to claim 12, wherein the polymerization is effected with maintaining a pressure slightly above or slightly below normal pressure if it is necessary in view of the boiling point of the used liquid foaming agent.

14. Process according to claim 12, wherein the PUR foam material thus produced is stored for a period ranging from 2 days to several months, at a temperature being room temperature up to a slightly elevated temperature, and at a pressure being normal pressure down to a slightly decreased pressure.

15. Process according to claim 12, wherein the emulsion of the liquid foaming agent in the alcoholic starting component with addition of the other usual additives is effected continuously in a suitable premixer and the isocyanate component is admixed to the so produced emulsion thereafter.

16. Process according to claim 12, wherein the foaming agent is emulgated in the alcoholic starting component with admixture of the other usual additives and with further admixture of one or several emulsifying agents.

17. Process according to claim 16, wherein the emulgating agent or emulsifying agents are added in an amount of up to 10% by weight based upon the weight of the alcoholic starting component for the PUR foam material to be produced.

18. Process according to claim 16, wherein the emulsifying agent or emulsifying agents is a derivative of a fatty acid.

19. Process according to claim 12, wherein the used polymerization catalyst is selected from the group consisting of the basic catalysts known for PUR polymerization and the strongly basic catalyst known for such a reaction.

20. Process as claimed in claim 12, wherein the non-halogenated organic liquid is n-pentane.

21. Process as claimed in claim 12, wherein the non-halogenated organic liquid is isopentane.

22. Process as claimed in claim 12, wherein either the used liquid foaming agent or the mixture of the alcoholic starting component and the liquid foaming agent is saturated with a gas selected from the group consisting of nitrogen in an amount larger than the usual nitrogen content of air, a noble gas and the mixture of several such gases.

23. Process as claimed in claim 22, wherein the noble gas is argon.

24. Process as claimed in claim 12, wherein there is used a flame retardant selected from the group consisting of the phosphorus containing liquid flame retardants, the phosphorus containing solid flame retardants, the boron containing flame retardants and the mixtures of several such flame retardants.

25. Process as claimed in claim 24, wherein the flame retardants are added in an amount of 5 to 35 parts by weight based upon the total weight of the final foam material.

26. Process as claimed in claim 12, wherein there is added as flame retardant one or several lower alkanol esters of the lower alkane phosphonates, wherein the lower alkanol and the lower alkane group each contain 1 to 4 carbon atoms, and the mixtures of several such liquid flame retardants.

27. Process as claimed in claim 26, wherein the lower alkane phosphonate contains 10 to 20 parts by weight of urea based upon the weight of the lower alkane phosphonate.

28. Process as claimed in claim 26, wherein the lower alkane phosphonate contains urea up to saturation.

* * * * *